United States Patent
Allard

[11] 3,859,567
[45] Jan. 7, 1975

[54] GROUND FAULT INTERRUPTER CIRCUIT WITH EXCITED SECONDARY WINDING ON DIFFERENTIAL TRANSFORMER

[75] Inventor: John J. Allard, Mishicot, Wis.
[73] Assignee: AMF Incorporated, White Plains, N.Y.
[22] Filed: Apr. 23, 1973
[21] Appl. No.: 353,222

[52] U.S. Cl. .......... 317/18 D, 317/27 R, 317/33 SC
[51] Int. Cl. ............................................... H02h 3/28
[58] Field of Search ............. 317/18 D, 27 R, 33 SC

[56] References Cited
UNITED STATES PATENTS
3,555,360  1/1971  Lee ................................... 317/18 D
3,769,548  10/1973  Pardue ............................. 317/18 D Primary Examiner—James D. Trammell
Attorney, Agent, or Firm—George W. Price; John H. Gallagher

[57] ABSTRACT

A ground fault interrupter circuit employing a transformer whose primary windings are respectively in series with the two conductors of a power distribution system. A multi-turn secondary winding of the transformer is continuously excited by current from the conductors to produce in the transformer core a continuous flux whose magnitude is substantially equal in magnitude and in opposite direction to the flux produced in the core by a differential current which flows in the primary windings when a fault current of minimum unacceptable magnitude is present. In the absence of a fault, the steady current through the secondary winding actuates sensing circuitry which permits a circuit breaker to maintain the source connected to the conductors. Upon presence of a fault on a conductor, flux in the core goes to zero, or reverses phase, and the sensing circuitry responds thereto to cause the circuit breaker to disconnect the source.

11 Claims, 2 Drawing Figures

GROUND FAULT INTERRUPTER CIRCUIT WITH EXCITED SECONDARY WINDING ON DIFFERENTIAL TRANSFORMER

BACKGROUND OF THE INVENTION

This invention relates to a ground fault interrupter (GFI) circuit for sensing an undesired ground connection or other hazardous conditions in current carrying conductors of an electrical distribution system, and upon sensing such a ground connection for interrupting current flow from the source of current.

In recent years many proposals have been offered for devices intended to provide protection for humans and property which inadvertently come into contact with a current conducting line of an electrical supply system, or which unexpectedly are subject to high current flow and thus shock and damage because of some fault occurring in the supply system. Many of these devices employ a differential transformer whose primary windings are the current carrying lines of the supply system and whose secondary winding is connected to fault detection circuitry. In the absence of a fault or hazard on the lines of the system the current flowing in one primary winding toward the load is equal to the current returning back to the source through the other primary winding. The equal currents in the primary windings of the transformer induce equal and opposing magnetic flux fields in the transformer core and no signal is coupled to the secondary winding. When a fault occurs in the system, such as a human becoming inadvertently connected from a current carrying line to ground, currents in the primary windings of the transformer no longer are equal and a resultant flux is established in the transformer core. This flux induces a signal in the secondary winding which is sensed by a sensing circuit and which in turn initiates operation of a circuit breaker to open the lines of the system.

In U.S. Pat. Nos. 3,555,360 issued Jan. 12, 1971 and 3,558,980 issued Jan. 26, 1971 there are disclosed GFI circuits of a general type which operate on the principle that a biasing flux is produced in the core of a differential transformer by means of a parallel or shunt circuit which passes continuous line current through a winding on the core. As is usual in a differential transformer of a GFI device, the two conductors of the power line are wound on the core as primary windings of the transformer. In the absence of a fault on the power line, the line currents passing through the two conductors are equal in magnitude and introduce equal and oppositely directed flux fields in the core of the transformer. Therefore, the only flux present in the transformer is a biasing flux produced by the previously mentioned continuous line current which is coupled through a winding of the transformer by way of the parallel circuit. The sensing circuit of the GFI senses the voltage across the continuously excited winding and a control circuit responds thereto to maintain a circuit breaker or other current interrupting means in a current supplying condition between the source of current and the load supplying terminals of the line conductors. In the presence of a fault on one of the current carrying conductors of the power line, the currents through the two primary windings no longer are equal and a resultant flux generated by the differential current cancels out the biasing flux. The secondary winding on the core of the transformer no longer is excited since no flux is flowing in the core and the sensing circuit responds thereto to actuate the control circuit which activates the current interrupting means to disconnect the source of current from the load terminals. The circuits disclosed in the above-mentioned patents have attractive features, but in U.S. Pat. No. 3,555,360 the biasing flux is produced in the core by means of a separate and independent biasing winding which is in addition to the two primary windings and the secondary winding of the differential transformer. The requirement that there be four independent windings on a small magnetic core significantly increases the difficulty of manufacture and the cost of a device of that type.

In the circuit disclosed in U.S. Pat. No. 3,558,980 the biasing flux is established in the core of the transformer by passing an additional biasing current through one of the primary windings of the differential transformer. In the circuit arrangement of that patent, this biasing current flowing through a primary winding represents a continuous additional power loss in this primary winding. The use of a considerable number of GFI circuits constructed in this manner represents an appreciable power loss which is of concern in view of present efforts to conserve energy. Furthermore, in the circuit of U.S. Pat. No. 3,558,980 the sensing and control circuitry is of such a nature that the current interrupting means may not be actuated in the event that a differential current resulting from a fault greatly exceeds the value of current for which the circuit was designed to operate. This means that the circuit may fail to operate in those situations where its need to operate is most important.

DESCRIPTION OF PREFERRED EMBODIMENT

Figure 1:
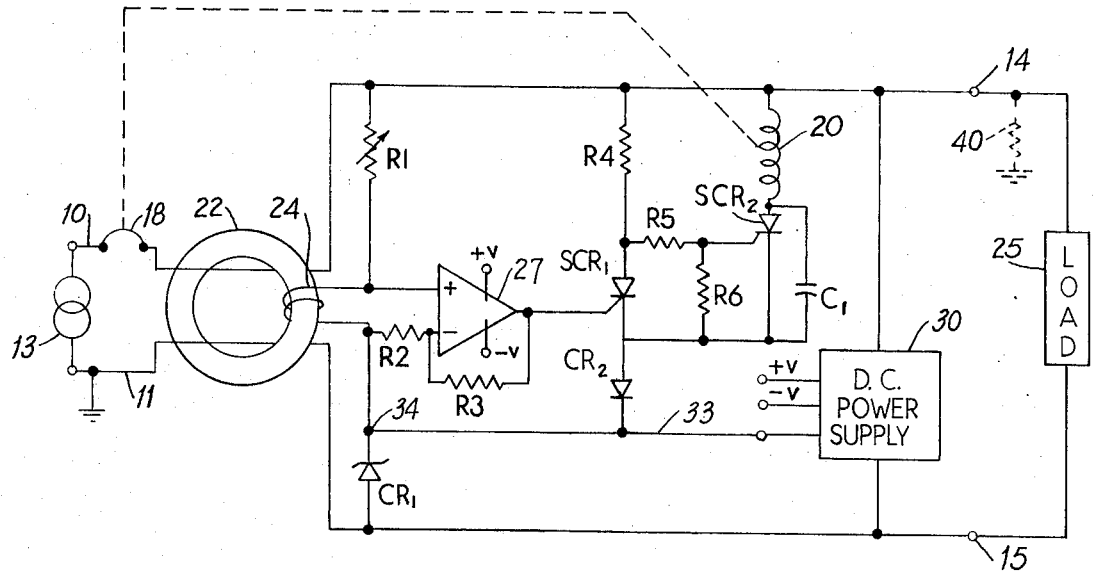
FIG. 1 is a simplified schematic drawing, partially in block form, illustrating a presently preferred embodiment of the present invention.

In FIG. 1, conductors 10 and 11 are respectively the "hot" and neutral conductors of the power line and connect a source 13 of 60 Hz current, for example, to respective load terminals 14 and 15. A manually settable circuit breaker 18 of conventional design has its normally closed contacts in conductor 10 for opening that conductor upon actuation of its coil 20. A magnetic core 22 is disposed about conductors 10 and 11 and serves as the core of a transformer whose primary windings are the conductors 10 and 11 and whose secondary winding is the multiple turn winding 24. As an example, second winding 24 may have 500 turns.

Secondary winding 24 is connected between line conductors 10 and 11 by means of a shunt circuit that includes sensitivity adjust resistor R1 and Zener diode $CR_1$. Secondary winding 24 also is coupled to fault sensing and circuit breaker control circuitry comprised of operational amplifier 27 having an input resistor R2 and a feedback resistor R3. Amplifier 27 is a non-inverting high gain operational amplifier of conventional design. The positive and negative D.C. voltages for operational amplifier 27 are obtained from a D.C.

power supply 30 connected across line conductors 10 and 11.

The output of amplifier 27 is connected to the gate electrode of silicon controlled rectifier device $SCR_1$ whose anode is connected through resistor R4 to line conductor 10 and whose cathode is connected through diode $CR_2$ to line 33 from power supply 30. Line 33 also is connected to the cathode of Zener diode $CR_1$ which establishes a voltage of approximately 6.8 volts at junction point 34.

The anode of $SCR_1$ is connected through resistor R5 to the gate electrode of $SCR_2$ which has its anode connected through circuit breaker coil 20 to line conductor 10 and its cathode connected to the junction between $SCR_1$ and diode $CR_2$. Resistor R6 is a biasing resistor between the gate and cathode electrodes of $SCR_2$. A capacitor $C_1$ is connected across the anode and cathode electrodes of $SCR_2$ and serves to suppress noise and prevent premature and erroneous conduction of $SCR_2$.

A load 25 may be connected across load terminals 14 and 15 of respective line conductor 10 and 11.

In the design and construction of the differential transformer of FIG. 1, conductors 10 and 11 pass through core 22 and constitute one turn primary windings. The continuously excited secondary winding 24 is a multi-turn winding which may have 500 turns, for example. The value of sensitivity adjust resistor R1 is proportioned relative to the number of turns of secondary winding 24 so that the continuous current flowing therethrough provides the number of ampere turns required to produce in core 22 a magnitude of flux which will be cancelled by the flux produced by a differential current between conductors 10 and 11 which has been selected to be the minimum differential current required to cause circuit breaker 10 to operate. This minimum value of differential current will be selected to assure that a human in contact with conductor 10 and ground, illustrated as fault 40, for example, will not suffer harm. Typically this minimum value of differential current might be 4.0 to 4.25 milliamperes. Because of the 500 to 1 turns ratio between the secondary winding 24 and a single turn primary winding, power consumed by the continuous excitation of secondary winding 24 amounts only to approximately 0.002 watt.

In the operation of the GFI circuit of this invention, assuming first that no fault is present on either of the conductors 10 or 11, and assuming a load 25 is connected to the two conductors, equal currents will flow in conductors 10 and 11 to and from the load 25. Equal currents in the primary windings of the transformer will generate equal and opposing flux fields in core 22 and these two flux components will cancel each other. Because secondary winding 24 is connected between conductors 10 and 11 and therefore is continuously excited by a predetermined current flow therethrough, this continuously excited winding produces a given magnitude of flux in core 22, as described above.

Secondary winding 24 also is connected as the input to operational amplifier 27. In the absence of an unbalance of differential current flow in the primary windings of the differential transformer, winding 24 will generate an input signal to amplifier 27. Operational amplifier 27, being a high gain non-inverting amplifier, amplifies the input signal and applies a biasing potential to the gate electrode of $SCR_1$. Secondary winding 24 is so wound that in the absence of a fault the signal coupled to the gate electrode of $SCR_1$ is in phase with the line voltage on the anode so that $SCR_1$ will conduct on each half cycle of line voltage. When $SCR_1$ conducts, its anode potential falls to a low value. The potential at the anode of conducting $SCR_1$ is coupled through resistor R5 to the gate electrode of $SCR_2$ but is of such a value when $SCR_1$ is conducting as to hold $SCR_2$ in the non-conducting state. In the absence of current flow through $SCR_2$, circuit breaker coil 20 is not energized. Therefore, contacts 18 of the circuit breaker maintain continuity of current flow through conductor 10. Under the conditions just described, the power distribution system including conductors 10 and 11 will function in the desired manner to provide current to load 25.

In the presence of a fault 40 on conductor 10, for example, and assuming that the fault produces a differential current flow of approximately 4 milliamperes in the primary windings of the transformer, a corresponding flux will be produced in core 22 in opposition to the steady or biasing flux produced by the excited secondary winding 24. In this situation, secondary winding 24 will produce no input signal to operational amplifier 27. The absence of a signal on the gate electrode of $SCR_1$ will render it non-conductive since both its gate and cathode electrodes are at the 6.8 volt level established by Zener diode $CR_1$. The anode potential of $SCR_1$ will rise to a value sufficient to bias $SCR_2$ into its conducting state. Current flow through $SCR_2$ energizes circuit breaker coil 20 which in turn actuates the mechanism of the circuit breaker to open its contacts 10, thereby disconnecting the source 13 from conductors 10 and 11.

A circuit constructed and operated as described above eliminates many of the design problems and undesired circuit operations that arise in some circuits due to tolerances in component values and due to changes in component values and supply voltages. The reason for this is that in the present invention the critical relationship involved in the initiation of the operation of the ground fault circuit is dependent solely on the ampere turns relationship between the primary and secondary windings of the transformer. The establishment of this relationship is accomplished by the simple expedient of adjusting the resistance value of sensitivity adjust resistor R1 which is in series with secondary winding 24.

A further advantageous feature of the above-described circuit is that the sensing of a fault condition and operation of the circuit breaker is assured even in the event that the differential current flowing through the primary windings of the transformer may be very large so as to induce in core 22 a flux which greatly exceeds the steady biasing flux produced by excited winding 24. The reason for this is that in the event the differential current in the primary windings induces in core 22 a much greater flux than does secondary winding 24, the resultant flux then would be 180° out of phase with the steady biasing flux and would produce a signal in winding 24 which is 180° out of phase with its usual exciting voltage. This oppositely phased signal is amplified by non-inverting amplifier 27 and applied to the gate electrode of $SCR_1$. With opposing phase relationship on the anode and gate electrodes of $SCR_1$ it will be rendered non-conductive which, of course, is the desired condition to be achieved in the presence of a fault.

As previously mentioned, the silicon control rectifiers will conduct only on half cycles when the gate and anode voltages are of proper like potential. It has been demonstrated that the operation of the circuit of FIG. 1 is sufficiently fast to afford adequate protection to a human connected from the hot conductor 10 to ground. If desired, circuit modifications may be introduced to cause the silicon control rectifiers to conduct, when desired, on both half cycles of line voltage. In view of the above teaching the required circuit modifications are well within the capabilities of one skilled in the art.

The discussion of FIG. 1 has been based on an assumption that the fault to be detected was an unintended ground connection on the hot conductor 10. Another hazardous fault condition to be guarded against is an unintended grounding of neutral conductor 11 on the load side of the transformer, as schematically illustrated by fault 44 in FIG. 2. The danger inherent in this condition is that if a grounded person now were to come into contact with conductor 10, part of the current flowing through the person and back to the ground at the source 13 may flow to unintended ground 44 and thence through neutral conductor 11, through the transformer and then to ground at source 13. Because a portion of the fault current returns to the source ground through the transformer, the differential current between the primary windings may not be of sufficient magnitude to activate the GFI circuit, despite the fact that the fault current flowing through the person to ground at fault 40 exceeds the magnitude of 5 milliamperes which generally is considered to be the maximum permissible current which will likely avoid physiological harm to a human.

The circuit illustrated in FIG. 1 is capable of sensing a grounded neutral conductor as described above. The circuit illustrated in simplified form in FIG. 2 is an alternative embodiment of the present invention which exhibits increased sensitivity to detect an undesired ground connection on the load side of the neutral conductor 11.

Figure 2:
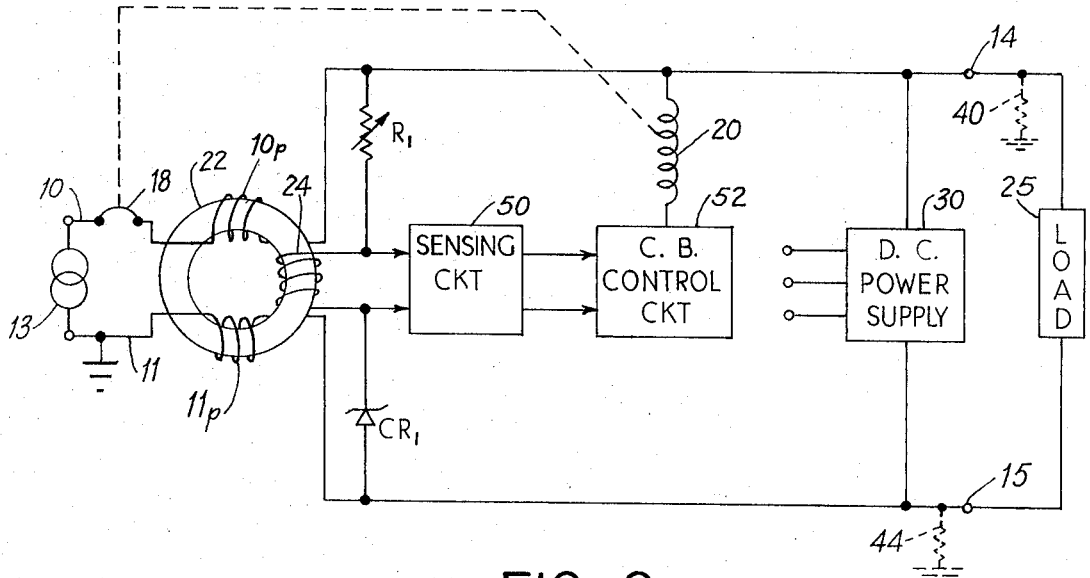
FIG. 2 is a simplified schematic drawing, partially in block form, illustrating an embodiment of the invention which is particularly sensitive in detecting an undesired ground connection on the load side of the neutral conductor.

In FIG. 2, the components that are similar to those illustrated in FIG. 1 are designated by like reference characters. That is, line conductors 10 and 11 connect source 13 to load terminals 14 and 15. The primary windings 10p and 11p on core 22 differ from the primary windings illustrated in FIG. 1 in that they are multiple turn windings of perhaps 10 or more turns rather than single turn windings as in FIG. 1. Otherwise, the transformer is similar to that discussed above and includes the continuously excited multi-turn secondary winding 24 which is connected between line conductors 10 and 11 by the shunt connection that includes sensitivity adjust resistor R1 and Zener diode $CR_1$. As in the circuit of FIG. 1, winding 24 may have 500 turns, as an example. A fault sensing circuit 50 is connected across secondary winding 24 to sense a change in voltage level on winding 24, as will be discussed more fully herebelow. Circuit breaker control circuit 52 is coupled to receive the output of sensing circuit 50 and in response thereto controls the energization of circuit breaker coil 20 to open contacts 18 upon the sensing of a fault condition.

In the operation of the circuit of FIG. 2, first assuming that no fault is present on either conductor 10 or 11, currents flowing in primary windings 10p and 11p to and from load 25 are equal and will induce in core 22 equal and oppositely directed flux fields which cancel each other. The continuous excitation of secondary winding 24 produces a steady biasing flux in core 22 which is proportioned to have a magnitude equal to the flux produced by a differential current in the primary windings when a fault current of minimum unacceptable magnitude is flowing. The voltage across continuously excited secondary winding 24 is coupled as the input signal to sensing circuit 50 which responds thereto to place circuit breaker control circuit 52 in a condition to prevent current flow through circuit breaker coil 20, thus maintaining circuit breaker contacts 18 in a closed position.

Assuming now that an unintended ground connection 44 exists on the load side of the transformer, the loads of primary windings 10p and 11p no longer are equal and balanced so that a change in load is reflected back to secondary winding 24. This results in a change in voltage drop across secondary winding 24 and causes a change in the magnitude of the input signal to sensing circuit 50. Sensing circuit 50 operates in a manner of a switch upon sensing a change in voltage across winding 24. The switching action of sensing circuit 50 initiates operation of circuit breaker control circuit 52, energizing circuit breaker coil 20 and thereby opening contacts 18 to disconnect source 13 from line conductors 10 and 11. The above circuit operation is substantially the same whether or not a load 25 is connected to load terminals 14 and 15.

The circuit of FIG. 2 is highly sensitive in detecting a ground fault condition and the sensitivity of the circuit is not reduced when the neutral conductor is grounded on the load side of the transformer, as is the case in some grounded neutral detector circuits proposed in the past.

The nature of sensing circuit 50 may be somewhat different from the operational amplifier 27 of FIG. 1 in that it may function to initiate operation of circuit breaker control circuit 52 in response to some predetermined change in level of its input signal, this change not necessarily requiring that the input signal go to zero. Switching type circuits having this type of operating capabilities are well known to those skilled in the art.

An attractive feature of the circuit of FIG. 2 is that an undesired ground connection on either line conductor 10 or 11 may be detected by means by the illustrated circuitry that requires but one transformer. This significantly simplifies the design and manufacture of the device and reduces its cost.

In the circuits of both FIGS. 1 and 2 holding relays may be utilized in the place of conventional manually settable circuit breakers. That is, in the absence of a fault, relay control circuitry operating in response to sensing circuitry would produce a continuous relay holding current which would maintain normally open relay contacts in a closed current conductive condition. Upon occurrence of a fault on the conductors, the relay holding current would be interrupted and the relay contacts would open.

Representative values for circuit elements, and types of circuit elements used in the circuit of FIG. 1 are as follows.

| R1 | 20.0 m ohms | $C_1$ | .01 µ farads |
|----|----|----|----|
| R2 | 4.7 k ohm | $CR_1$ | 1N5235 |
| R3 | 3.9 m ohm | $CR_2$ | 1N4004 |

-Continued

| R4 | 47.0 k ohm | SCR₁ | 2N5064 |
| --- | --- | --- | --- |
| R5 | 56.0 k ohm | SCR₂ | 2N5064 |
| R6 | 1.0 k ohm | Op.Amp. 27 | Type 741 |

What is claimed is:

1. A circuit for detecting a fault condition in a power distribution system and for producing in response to a detected fault a signal that is useful in the operation of current interrupter means in said system to interrupt current flow therein, said circuit comprising at least first and second current carrying conductors for connecting a source of current for said system to respective load terminals, the first one of said conductors being grounded at said source, transformer means having first and second like windings in series connection, respectively, with each of said two conductors, said first and second windings being wound in balanced relationship, said transformer means including a multi-turn third winding inductively coupled to said first and second windings, output means connected to said third winding for providing an output signal useful in the operation of a current interrupter means in said system, means connecting said third winding to said source for passing a predetermined magnitude of current from said source through the third winding to establish at said output means, in the absence of a fault on one of said conductors, a signal of predetermined finite magnitude, said third winding being wound to produce magnetic flux in the transformer means in opposition to flux produced by the second one of said windings.

2. The combination claimed in claim 1 wherein said first and second windings are single turn windings and said third winding has many more turns than the primary windings.

3. The combination claimed in claim 1 wherein all three of said transformer windings are multi-turn windings.

4. The circuit claimed in claim 1 wherein the means connecting the third winding to said source is proportioned to pass a current through said third winding sufficient in magnitude to establish in said transformer means a magnitude of magnetic flux approximately equal to that produced by a differential current flowing in said first and second conductors when a fault current of minimum unacceptable magnitude is flowing in said system.

5. The combination claimed in claim 4 wherein the means connecting said third winding to said source comprises a shunt circuit between said two conductors including impedance means in series connection with the third winding for establishing said predetermined magnitude of current flow through the third winding.

6. The combination claimed in claim 1 wherein said first and second windings comprise single turn windings and said third winding has many more turns than the first and second windings, said impedance means and the turns of said third winding being proportioned to produce an ampere turns value which is equal to the ampere turns value associated with said first and second windings when a differential fault current flows therethrough which has been predetermined to be of undesired magnitude, whereby the current in the third winding is less than said differential current by a large multiple.

7. A circuit for detecting a fault condition in a power distribution system and for producing in response to a detected fault a signal that is useful in the operation of current interrupter means in said system to interrupt current flow therein, said circuit comprising at least first and second current carrying conductors for connecting a source of current for said system to respective load terminals, the first one of said conductors being grounded at said source, transformer means having first and second like windings in series connection, respectively, with each of said two conductors, said first and second windings being wound in balanced relationship, said transformer means including a multi-turn secondary winding inductively coupled to said first and second conductors, output means connected to said secondary winding, means connecting said secondary winding between said first and second conductors for passing a predetermined magnitude of current from said source through the secondary winding to establish at said output means, in the absence of a fault on one of said conductors, a signal of predetermined finite magnitude, said secondary winding being wound on the transformer means to produce therein a magnetic flux in opposition to magnetic flux produced by a differential current flowing in said conductors when a fault is present in said system, whereby the occurrence of a fault in said system causes a change in the finite magnitude of said signal at said output means.

8. The circuit claimed in claim 7 wherein the means connecting said secondary winding between said first and second conductors is proportioned to pass a current through the secondary winding sufficient in magnitude to establish in said transformer means a magnitude of magnetic flux which, when opposed by magnetic flux produced by a differential current flowing in said first and second conductors as a result of a fault current of minimum unacceptable magnitude flowing in said system, causes a decrease in said signal of predetermined finite magnitude at said output means.

9. The combination claimed in claim 8 wherein said means for connecting said secondary winding to said source comprises a shunt circuit between said two conductors including impedance means in series connection with the secondary winding for permitting a given value of source current to flow through the secondary winding.

10. The combination claimed in claim 9 wherein said primary windings comprise single turn windings and said secondary winding has many more turns than the primary windings, said impedance means and the turns of said secondary winding being proportioned to produce an ampere turns value which is equal to the ampere turns value associated with said primary windings when a differential fault current flows therethrough which has been predetermined to be of minimum undesired magnitude whereby the current in the secondary winding is less than said differential fault current by a large multiple.

11. The combination claimed in claim 8 wherein said primary windings and said secondary winding all are multiple-turn windings.

* * * * *